United States Patent
Yamamoto et al.

[11] Patent Number: 6,069,429
[45] Date of Patent: May 30, 2000

[54] SPINDLE MOTOR

[75] Inventors: Kazuyuki Yamamoto; Kenichi Ogiso; Kouei Matsukawa, all of Tokyo, Japan

[73] Assignee: Mitsubishi Denki Kabushiki Kaisha, Tokyo, Japan

[21] Appl. No.: 09/335,266

[22] Filed: Jun. 17, 1999

[30] Foreign Application Priority Data

Jun. 17, 1998 [JP] Japan .................................. 10-169800
May 7, 1999 [JP] Japan .................................. 11-126892

[51] Int. Cl.$^7$ .............................. H02K 7/08; F16C 32/06
[52] U.S. Cl. ............................................. 310/90; 310/67 R
[58] Field of Search .................................. 310/90, 67 R; 384/107, 112

[56] References Cited

U.S. PATENT DOCUMENTS

| | | | |
|---|---|---|---|
| 4,998,033 | 3/1991 | Hisabe et al. | 310/90 |
| 5,770,906 | 6/1998 | Hazelton et al. | 310/90 |
| 5,847,479 | 12/1998 | Wang et al. | 310/90 |
| 5,969,448 | 10/1999 | Liu et al. | 310/90 |

FOREIGN PATENT DOCUMENTS

| | | | |
|---|---|---|---|
| 6311695 | 11/1994 | Japan | H02K 7/08 |
| 6315242 | 11/1994 | Japan | H02K 7/08 |

Primary Examiner—Nestor Ramirez
Assistant Examiner—Burt Mullins
Attorney, Agent, or Firm—Leydig, Voit & Mayer

[57] ABSTRACT

A spindle motor includes a hydrodynamic gas radial bearing in which an inner ring, which is a radial shaft member, fixed to a bracket, and an outer ring, which is a radial bearing member, fixed to a housing are opposed to each other in a radial direction of the housing; and a hydrodynamic gas thrust bearing having a thrust bearing surface, which is a thrust shaft member, located on an upper surface of the inner ring and a thrust plate, which is a thrust bearing member, fixed to the housing are opposed to each other in the axial direction of the housing, wherein opposing surfaces of the thrust bearing surface and the thrust plate of the hydrodynamic gas thrust bearing are located within a bearing-functional-dimension region L of the hydrodynamic gas radial bearing.

6 Claims, 5 Drawing Sheets

SPINDLE MOTOR

BACKGROUND OF THE INVENTION

1. Field of the Invention

The present invention relates to a spindle motor used in a magnetic recording apparatus such as a hard disk drive (HDD), and more particularly to a spindle motor having a bearing which requires high rotational accuracy.

2. Description of the Related Art

Conventionally, in conjunction with trends toward a higher storage capacity and a shorter access time of a rotatingly driven portion, e.g., a hard disk drive (HDD), of a magnetic storage device, a spindle motor used for driving the HDD is correspondingly required to rotate at high speed and with high accuracy. Namely, a spindle motor having a bearing device adapted to such high-speed high-accuracy rotation is required.

As bearings adapted to such high-speed high-accuracy rotation, hydrodynamic fluid radial bearings are known, and a hydrodynamic oil radial bearing, in particular, is used as a bearing having a large load carrying capacity and suited to miniaturization. As a spindle motor in which a hydrodynamic oil radial bearing is adopted, one disclosed in, for example, Japanese Patent Application No. Hei. 6-311695 is known.

Figure 9:
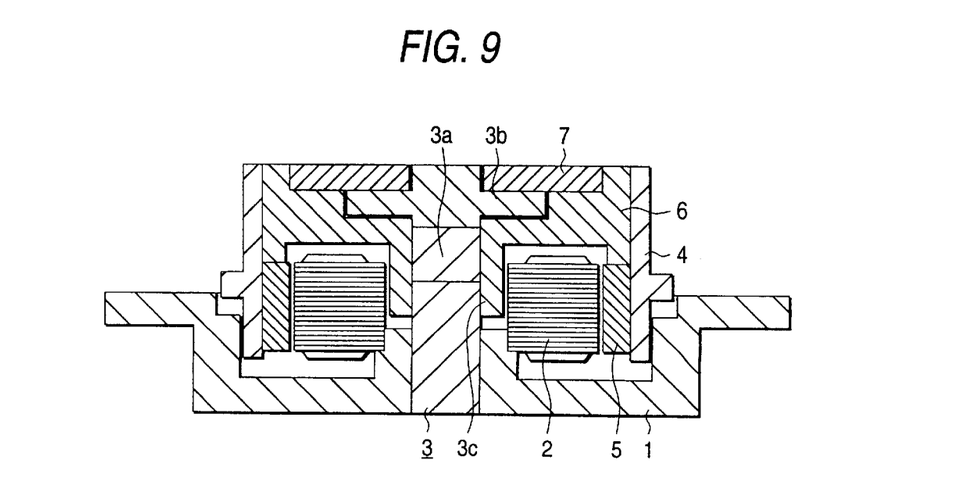
FIG. 9 is a schematic cross-sectional view illustrating conventional spindle motor.

FIG. 9 is a schematic cross-sectional view illustrating a conventional spindle motor in which a hydrodynamic oil radial bearing is adopted. In the drawing, reference numeral 1 denotes a bracket having a flange fixed to a base of an information apparatus body such as a hard disk; numeral 2 denotes a stator fixed to the bracket 1; and numeral 3 denotes a shaft fixed to a central portion of the bracket 1, the shaft 3 having a shape in which a cylindrical portion and a disk-shaped collar portion are combined. The cylindrical portion of this shaft 3 has grooves formed therein for generating dynamic pressure, and serves as a hydrodynamic oil radial bearing 3a, while the disk-shaped portion of the shaft 3 has dynamic-pressure generating grooves formed in its upper and lower surfaces, and serves as a hydrodynamic oil thrust bearing 3b. Numeral 4 denotes a housing for retaining a disk (not shown), which is a recording medium, and numeral 5 denotes a rotor which is secured to an inner peripheral surface of the housing 4 and is formed of an annular magnet. Numeral 6 denotes a sleeve member secured to an inner peripheral surface of the housing 4, and this sleeve member 6 has an appropriate gap with each of the hydrodynamic oil radial bearing 3a and the hydrodynamic oil thrust bearing 3b, and receives a radial force and a thrust force due to the dynamic pressure generated between the sleeve member 6 and the shaft 1 when the motor rotates. Numeral 7 denotes a thrust holder fixed to the sleeve member 6.

The conventional spindle motor is constructed as described above, and the rotor 5 is rotatively driven by electromagnetic action between the stator 2 and the rotor 5, which in turn causes the housing 4, the sleeve member 6, and the thrust holder 7 to be rotatively driven with respect to the shaft 3. In conjunction with the rotation, dynamic pressure is generated at the hydrodynamic oil radial bearing 3a and the hydrodynamic oil thrust bearing 3b, so that the sleeve member 6 and the thrust holder 7 rotates at high speed and with high accuracy without coming into contact with the shaft 3.

In the above-described spindle motor having the hydrodynamic oil radial bearing and the hydrodynamic oil thrust bearing, there have been problems in that since oil is used as a lubricant, if this spindle motor is applied to a large-capacity storage device for which high speed and high accuracy are required, the disk may possibly become contaminated due to the scattering of oil, and the rotational accuracy may change since a change in the properties of oil can occur due to a temperature change caused by the heat generated by the motor.

These problems occur since oil is used as the lubricant, and as a means for overcoming these problems, it is generally conceivable to use a hydrodynamic gas radial bearing and a hydrodynamic gas thrust bearing. The hydrodynamic gas radial bearing and the hydrodynamic gas thrust bearing are those in which oil is replaced by gas as the lubricant in the hydrodynamic oil radial bearing and the hydrodynamic oil thrust bearing. It is true that if the hydrodynamic gas radial bearing and the hydrodynamic gas thrust bearing are used, the problem of contamination with oil can be overcome; however, since the load carrying capacity is small, it is necessary to increase the length of the bearing, which gives rise to another problem that the outside diameter and dimensions become larger than those of the hydrodynamic oil bearing.

Further, with the hydrodynamic gas radial bearing, it is also necessary to increase the rigidity and processing accuracy of the bearing retaining portion, so that there has been a problem in that it is difficult to realize a compact and inexpensive spindle motor.

SUMMARY OF THE INVENTION

The present invention has been devised to overcome the above-described problems, and its object is to obtain a compact and low-cost spindle motor in which a fluid such as a lubricant does not scatter.

As described above, in accordance with the present invention, the arrangement provided is such that the spindle motor comprises: a hydrodynamic gas radial bearing in which a radial shaft member fixed to a fixing member and a radial bearing member fixed to a rotating member are opposed to each other in a radial direction of rotation of the rotating member; and a thrust bearing in which a thrust shaft member fixed to the fixing member and a thrust bearing member fixed to the rotating member are opposed to each other in an axial direction of rotation of the rotating member, wherein opposing surfaces of the thrust shaft member and the thrust bearing member of the thrust bearing are arranged within a bearing-functional-dimension region of the hydrodynamic gas radial bearing. Accordingly, it is possible to obtain an advantage in that the spindle motor can be made compact.

In addition, since the thrust bearing is a hydrodynamic gas thrust bearing, it is possible to obtain an advantage in that while both the radial bearing and the thrust bearing are formed by hydrodynamic gas bearings, the spindle motor can be made compact. Further, since a fluid is not used as the lubricating oil for the bearing, it is possible to obtain an advantage in that the fluid such as oil does not scatter due to high-speed rotation.

In addition, the thrust bearing is a hydrodynamic fluid thrust bearing, the radial shaft member is formed in a shape of a hollow cylinder, the thrust bearing member is disposed inside the hollow cylinder, and a magnetic-fluid retaining mechanism for retaining a magnetic fluid is provided on an inner surface of the hollow cylinder of an upper portion of the thrust bearing member. Therefore, even if a hydrodynamic fluid thrust bearing is adopted as the thrust bearing, it is possible to obtain an advantage in that the fluid such as oil does not scatter due to high-speed rotation.

In addition, since the radial shaft member is formed in a shape of a hollow cylinder, a ball is provided inside the hollow cylinder, and the thrust bearing member is supported by a surface of the ball, it is possible to obtain advantages in that the thrust plate can be supported at one point with excellent accuracy, and that the spindle motor can be manufactured easily at low cost. Further, since portions of contact between the thrust plate and the ball are close to points, the relative speed is slow even at high-speed rotation, so that it is possible to obtain an advantage in that even if the spindle motor is used over long periods of time, the amount of wear is small, and high-accuracy rotation can be maintained.

In addition, since a ratio between, on the one hand, a radial bearing diameter which is a center diameter of a circumference at a center between the radial shaft member and the radial bearing member and, on the other hand, an electromagnetic diameter which is a center diameter of a circumference between a stator and a rotor for rotating the radial bearing member by electromagnetic action is greater than or equal to 2/5 and less than or equal to 4/5, it is possible to obtain advantages in that the load carrying capacity can be made large, and that high rotational accuracy can be realized.

In addition, since the thrust bearing member is fixed to an upper surface of the radial bearing member, and an upper surface of the radial shaft member is formed as the thrust shaft member, it is possible to obtain an advantage in that while both the radial bearing and the thrust bearing can be formed by hydrodynamic gas bearings, the spindle motor can be made compact.

In addition, since the hydrodynamic gas thrust bearing is disposed on an outer side of the hydrodynamic gas radial bearing, there is an advantage in that the peripheral speed of the spindle motor can be made high, and high rigidity can be obtained.

In addition, since a portion of the thrust bearing member is extended into an interior of the hollow cylinder so as to support a surface of the ball, it is possible to obtain an advantage in that the spindle motor can be made compact.

In addition, since the thrust bearing member is fixed to the rotating member through a buffer member, it is possible to obtain an advantage in that the portion of the housing where the thrust plate is interiorly fitted need not be processed to high accuracy, so that the spindle motor can be manufactured easily.

The present disclosure relates to the subject matter contained in Japanese patent application Nos. Hei. 10-169800 (filed on Jun. 17, 1998) and Hei. 11-126892 (filed on May 7, 1999) which are expressly incorporated herein by reference in their entirely.

DETAILED DESCRIPTION OF THE PREFERRED EMBODIMENTS

[First Embodiment]

Figure 1:
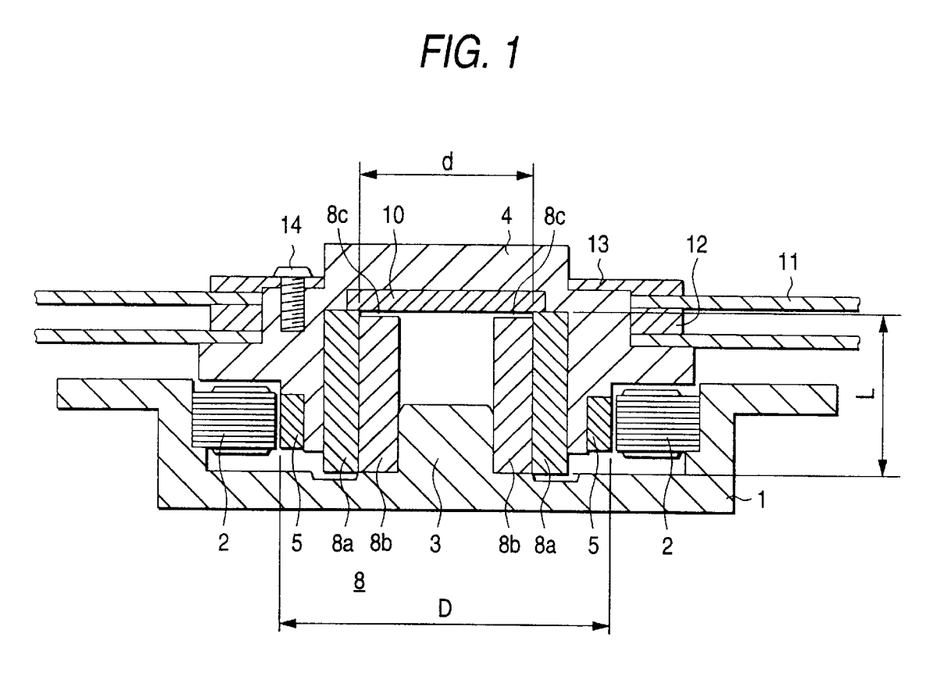
FIG. 1 is a schematic cross-sectional view illustrating a spindle motor in accordance with a first embodiment of the present invention.

FIG. 1 is a schematic cross-sectional view illustrating a spindle motor in accordance with a first embodiment of the present invention. In the drawing, reference numeral 1 denotes a bracket which is a fixing member, and 2 denotes a stator, and its outer peripheral portion is positioned at and fixed to an inner peripheral portion of the bracket 1. Numeral 3 denotes a shaft formed in a central portion of the bracket 1, numeral 4 denotes a housing which is a rotating member, and numeral 5 denotes a rotor which is formed of a magnet positioned at the housing 4 in face-to-face relation to the stator 2.

Numeral 8 denotes a hydrodynamic gas radial bearing which is comprised of an outer ring 8a which is a radial bearing member having a hollow cylindrical shape and fixed to an inner peripheral surface of the housing 4, as well as an inner ring 8b which is a radial shaft member fixed to the shaft 3 formed in a central portion of the bracket 1. Grooves for generating dynamic pressure are formed in an inner peripheral portion of the outer ring 8a or an outer peripheral portion of the inner ring 8b, and the shaft 3 is fixed to the bracket 1 and is fitted halfway in the inner ring 8b.

Numeral 10 denotes a thrust plate which is a thrust bearing member secured to the housing 4, and forms a hydrodynamic gas thrust bearing together with a thrust bearing surface 8c serving as a thrust shaft member. The thrust bearing surface 8c is formed at the upper surface of the inner ring 8b of the hydrodynamic gas radial bearing, and has grooves formed therein for producing dynamic pressure. The thrust plate 10 is secured to the housing 4 in such a manner that its lower surface abuts against an upper surface of the outer ring 8a. Reference numeral 11 denotes a plurality of disks for recording information, and the disks 11 are fixed to the housing 4 by means of a holding plate 13 and screws 14 via a spacer 12.

It should be noted that d in the drawing denotes the center diameter at the center between the inner ring 8b and the outer ring 8a of the hydrodynamic radial bearing (hereafter, this center diameter will be referred to as the bearing diameter), and D denotes the center diameter at the center between the stator 2 and the rotor 5 (hereafter, this center diameter will be referred to as the electromagnetic diameter). The method of determining this bearing diameter d and the electromagnetic diameter D will be described later in the seventh embodiment. In addition, L denotes a bearing-functional-dimension region which is a heightwise dimension of the hydrodynamic gas radial bearing along the axial direction of the outer ring 8a.

Next, a description will be given of the operation. In the spindle motor in this embodiment, in the same way as in the conventional example, the rotor 5 is rotatively driven by the electromagnetic action of the stator 2 and the rotor 5. In conjunction with this rotative driving, the housing 4, the outer ring 8a of the hydrodynamic gas radial bearing, and the thrust plate 10 rotate integrally, which in turn causes dynamic pressure to be generated for the hydrodynamic gas radial bearing 8, allowing the outer ring 8a to rotate in noncontact with the inner ring 8b. In addition, in conjunction with the rotation, dynamic pressure is also generated for the thrust plate 10 between the same and the thrust bearing surface 8c, allowing the thrust plate 10 to rotate in noncontact with the thrust bearing surface 8c.

In this embodiment, as illustrated in the drawing, since the arrangement provided is such that opposing surfaces of the thrust bearing surface 8c and the thrust plate 10, both of the hydrodynamic gas thrust bearing, are arranged within the bearing-functional-dimension region L of the hydrodynamic gas radial bearing (the bearing-functional-dimension region L referred to herein includes a heightwise outermost end of the outer end 8a), both the radial bearing and the thrust bearing can be formed by hydrodynamic gas bearings, and the size of the spindle motor can be made small. In addition, since both the radial bearing and the thrust bearing can be formed by hydrodynamic gas bearings, high-accuracy rotation can be realized, and the situation can be prevented in which a fluid, such as a lubricating oil, is scattered and contaminates the disk surface. Further, since the hydrodynamic gas thrust bearing is spaced apart from the center axis of rotation of the housing 4, the load carrying capacity accompanying the rotation can be utilized efficiently.

Further, as a material of the hydrodynamic gas radial bearing 8, even if an expensive material such as a ceramic, which has long service life, undergoes little dimensional change with respect to a temperature change, and is capable of maintaining high-accuracy rotation over extended periods of time, is used, since the radial shaft member 8b is made a hollow cylinder, only a necessary and minimum material can be used, so that the material cost can be brought down to a low level. In addition, since the arrangement provided is such that the lower portion of the hollow cylinder of the radial shaft member 8b is held by the shaft 3, it is possible to secure necessary rigidity without affecting the overall height, with the result that high rotational accuracy can be realized.

[Second Embodiment]

Figure 2:
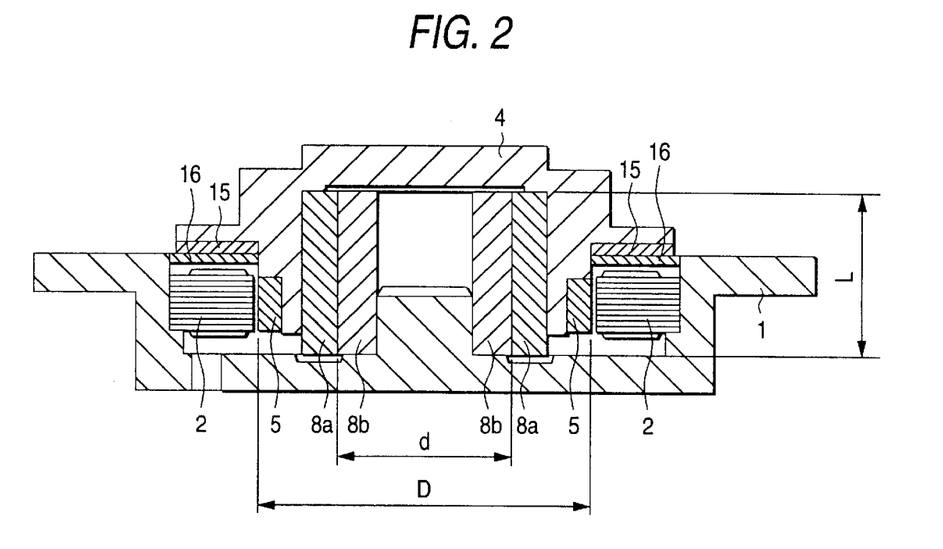
FIG. 2 is a schematic cross-sectional view illustrating a spindle motor in accordance with a second embodiment of the present invention.

FIG. 2 is a schematic cross-sectional view illustrating the spindle motor in accordance with a second embodiment of the present invention. In the drawing, reference numeral 15 denotes a thrust plate which is a thrust bearing member secured to the housing 4, and numeral 16 denotes a thrust bearing surface which is a thrust shaft member secured to the bracket 1, a hydrodynamic gas thrust bearing being formed by the upper surface of the thrust bearing surface 16 and the lower surface of the thrust plate 15.

Next, a description will be given of the operation. In the same way as in the above-described first embodiment, the rotor 5 is rotatively driven by the electromagnetic action of the stator 2 and the rotor 5. In conjunction with this rotative driving, the housing 4, the outer ring 8a of the hydrodynamic gas radial bearing, and the thrust plate 15 rotate integrally, which in turn causes dynamic pressure to be generated for the hydrodynamic gas radial bearing 8, allowing the outer ring 8a to rotate in noncontact with the inner ring 8b. In addition, in conjunction with the rotation, dynamic pressure is also generated for the thrust plate 15 between the same and the thrust bearing surface 16, allowing the thrust plate 15 to rotate in noncontact with the thrust bearing surface 16.

As illustrated in the drawing, in this embodiment, in the same way as in the above-described first embodiment, since the arrangement provided is such that opposing surfaces of the thrust bearing surface 16 and the thrust plate 15 are arranged within the bearing-functional-dimension region L of the hydrodynamic gas radial bearing, both the radial bearing and the thrust bearing can be formed by hydrodynamic gas bearings, and the size of the spindle motor can be made small. In addition, since the hydrodynamic gas thrust bearing is disposed at an outer peripheral portion located radially outwardly from the hydrodynamic gas radial bearing 8, the peripheral speed of the spindle motor can be made high, and high rigidity can be obtained.

[Third Embodiment]

Figure 3:
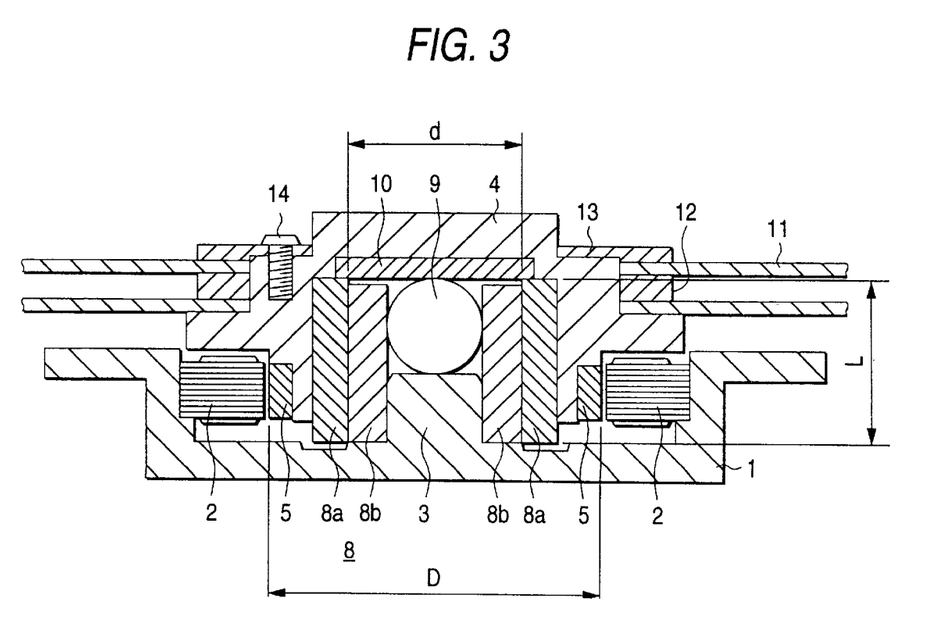
FIG. 3 is a schematic cross-sectional view illustrating a spindle motor in accordance with a third embodiment of the present invention.

FIG. 3 is a schematic cross-sectional view illustrating the spindle motor in accordance with a third embodiment of the present invention. In the drawing, reference numeral 9 denotes a ball fixed to the inner ring 8b of the hydrodynamic gas radial bearing 8, the ball 9 is supported by the shaft 3, and the apex of the ball 9 projects slightly from an end of the inner ring 8b.

Next, a description will be given of the operation. In the same way as in the above-described first embodiment, the rotor 5 is rotatively driven by the electromagnetic action of the stator 2 and the rotor 5, and the housing 4, the outer ring 8a of the hydrodynamic gas radial bearing, and the thrust plate 10 rotate integrally. At this time, the thrust plate 10 rotates while being supported by the apex portion of the ball 9.

To support the force acting on the thrust plate 10 in the thrust direction, it is ideal to support the force at one point at the central point of a circle. If this supporting means is a solid sphere, the force can be supported at one point. In addition, since the ball can be fabricated easily with high accuracy, there is an advantage in that the spindle motor can be manufactured at low cost. Furthermore, since portions of contact between the thrust plate 10 and the ball 9 are close to being a point, the relative speed is slow even at high-speed rotation, so that even if the spindle motor is used over long periods of time, the amount of wear is small, and high-accuracy rotation is maintained. In addition, since the ball 9 projects only slightly from the end of the inner ring 8b, it is possible to keep the height of the spindle motor low.

[Fourth Embodiment]

Figure 4:
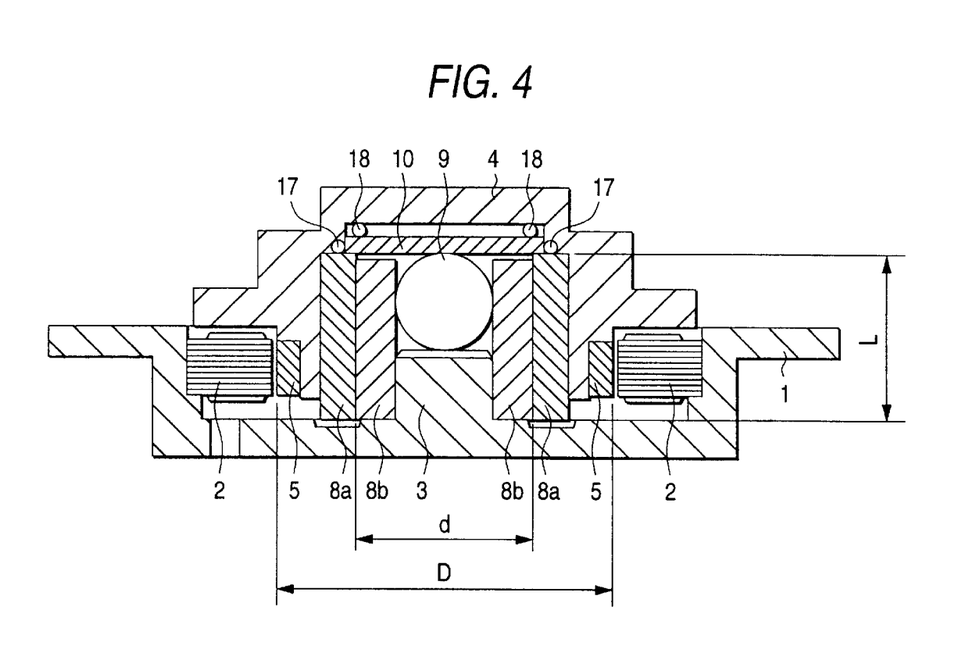
FIG. 4 is a schematic cross-sectional view illustrating a spindle motor in accordance with a fourth embodiment of the present invention.

FIG. 4 is a schematic cross-sectional view illustrating the spindle motor in accordance with a fourth embodiment of the present invention. In the drawing, reference numeral 17 denotes a buffer member formed by an elastic member such as an O-ring for positioning the thrust plate 10 in the radial direction, and numeral 18 denotes a buffer member formed by an elastic member such as an O-ring for positioning the thrust plate 10 by pressing the thrust plate 10 against the upper surface of the outer ring 8a of the hydrodynamic gas radial bearing.

Since the positions of the thrust plate 10 and the outer ring 8a are determined by the ball 9 by virtue of the provision of the buffer members 17 and 18, the portion of the housing 4 where the thrust plate 10 is interiorly fitted need not be processed to high accuracy, so that the spindle motor can be manufactured easily.

[Fifth Embodiment]

Figure 5:
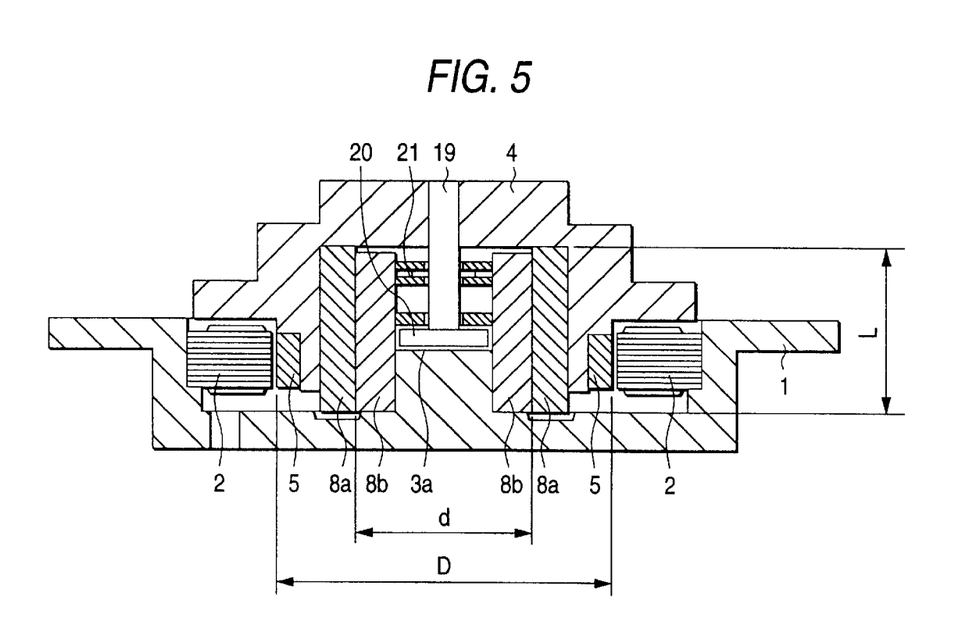
FIG. 5 is a schematic cross-sectional view illustrating a spindle motor in accordance with a fifth embodiment of the present invention.

FIG. 5 is a schematic cross-sectional view illustrating the spindle motor in accordance with a fifth embodiment of the present invention. In the drawing, reference numeral 19 denotes a thrust plate secured in the housing 4 in such a manner as to extend through and project from the housing 4 into the hollow cylindrical interior of the inner ring 8b of the hydrodynamic gas radial bearing, and numeral 20 is a thrust plate which is fixed to the thrust plate 19 and is a thrust plate bearing member having an outside diameter larger than that of the thrust plate 19. A shaft tip 3a formed on the bracket 1 serves as a thrust shaft member, and, together with the thrust members 19 and 20, constitute a hydrodynamic fluid thrust bearing in which a fluid such as oil is used as a lubricant. Numeral 21 denotes a magnetic-fluid retaining mechanism fixed to the inner periphery of the inner ring 8b, and the magnetic-fluid retaining mechanism 21 retains a magnetic fluid between the same and an intermediate portion of the thrust plate 19.

Next, a description will be given of the operation. In the spindle motor in accordance with this fifth embodiment, in the same way as in the above-described first embodiment, the housing 4 rotates, and the thrust plates 19 and 20 also rotate integrally. Since the thrust plate 20 and the shaft tip 3a constitute the hydrodynamic fluid thrust bearing, the thrust plate 20 floats from the shaft tip 3a by the pressure of oil, and rotates in noncontact therewith.

In accordance with this embodiment, since the oil of the hydrodynamic fluid thrust bearing, which has scattered due to the centrifugal force accompanying the rotation and has vaporized due to a temperature rise or the like, is sealed by the magnetic fluid retained by the magnetic-fluid retaining mechanism 21, the oil does not leak from the inner ring 8b to the outside, and the contamination of the hydrodynamic gas radial bearing 8 and the disk does not occur. Accordingly, the hydrodynamic fluid thrust bearing can also be used as the thrust bearing.

In addition, since the hydrodynamic gas radial bearing is adopted as the radial bearing and the hydrodynamic fluid thrust bearing is adopted as the thrust bearing, high-accuracy rotation can be realized. In addition, since the thrust bearing is provided inside the inner ring 8b of the hydrodynamic gas radial bearing, the spindle motor can be made compact.

[Sixth Embodiment]

Figure 6:
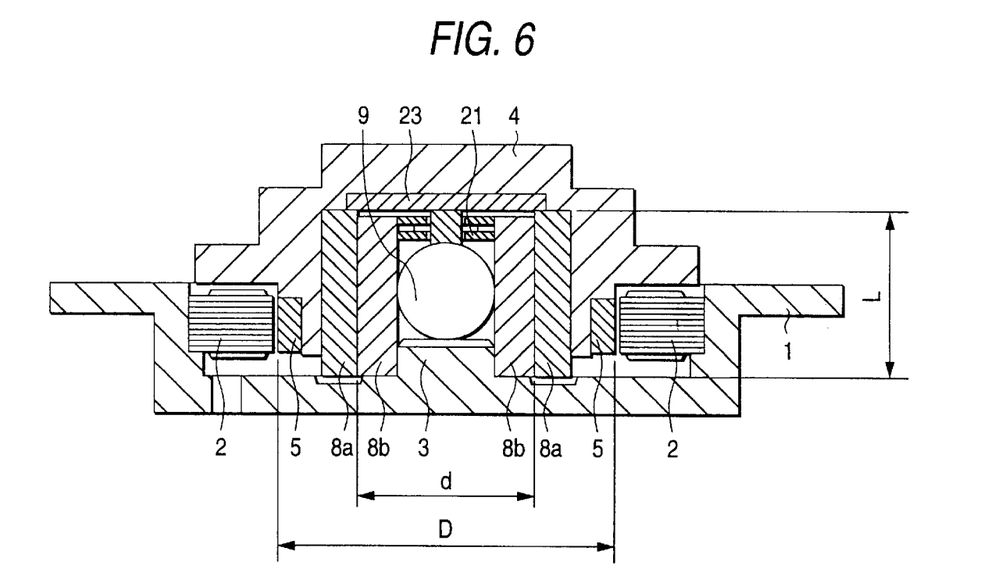
FIG. 6 is a schematic cross-sectional view illustrating a spindle motor in accordance with a sixth embodiment of the present invention.
Figure 7:
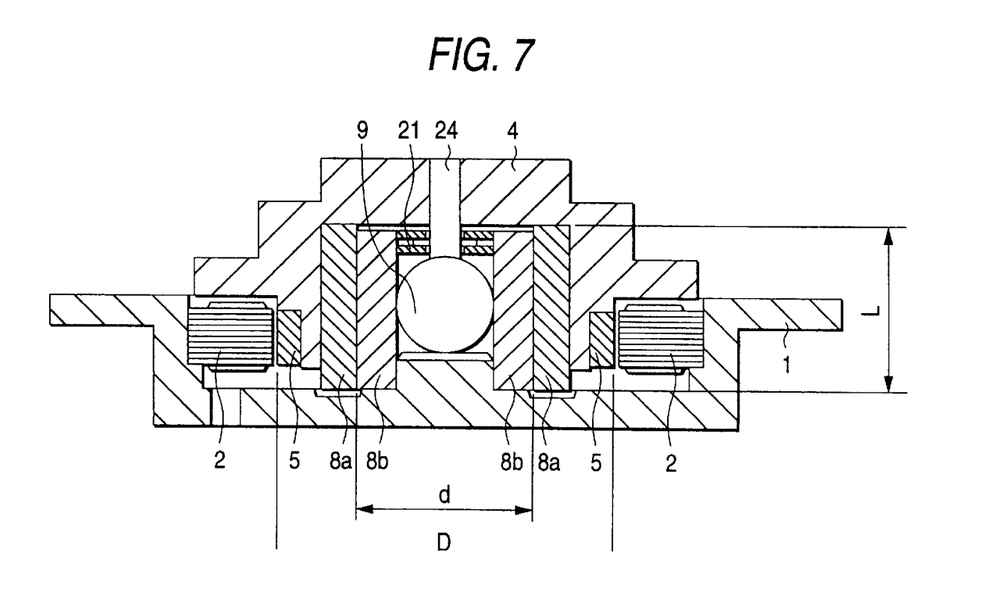
FIG. 7 is a schematic cross-sectional view illustrating a modification of the spindle motor in accordance with the sixth embodiment of the present invention.

FIGS. 6 and 7 are cross-sectional views illustrating the spindle motor in accordance with a sixth embodiment of the present invention. In FIG. 6, reference numeral 23 denotes a thrust plate which is a thrust bearing member having a projection which abuts against the ball 9 inside the hollow cylinder of the inner ring 8b of the hydrodynamic gas radial bearing. In FIG. 7, numeral 24 denotes a thrust plate which is a rod-shaped thrust bearing member abutting against the ball 9 inside the hollow cylinder of the inner ring 8b. In FIGS. 6 and 7, numeral 21 denotes the magnetic-fluid retaining mechanism which is disposed above the portions of contact between the ball 9 and the thrust members 23 and 24, and are fixed to the inner periphery of the inner ring 8b.

In accordance with this sixth embodiment, even if a lubricant such as oil is used at the points of contact between the ball 9 and the thrust plate 23 or 24, since the oil is sealed by the magnetic-fluid retaining mechanism, it is possible to prevent the contamination of the hydrodynamic gas radial bearing 8 and the disk with oil. Further, since the thrust bearing is provided inside the inner ring 8b, the overall height of the spindle motor is not affected, and the spindle motor can be made compact.

[Seventh Embodiment]

Figure 8:
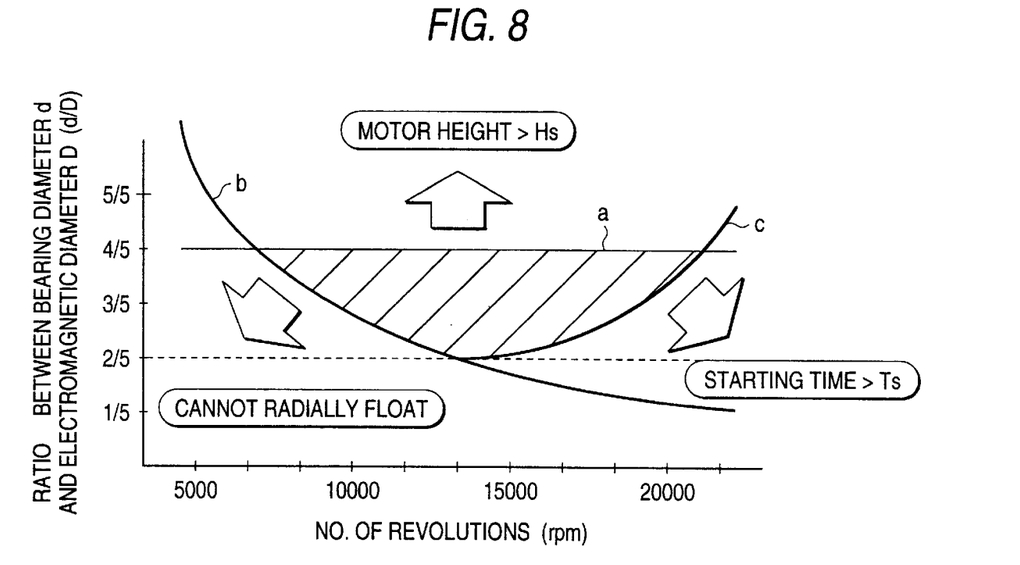
FIG. 8 is a diagram for explaining the spindle motor in the respective embodiments.

In this embodiment, a description will be given as to how the bearing diameter d and the electromagnetic diameter D can be determined in the above-described embodiments. FIG. 8 is a diagram for explaining the spindle motor in the above-described embodiments. In the drawing, the ordinate represents the ratio d/D between the bearing diameter d and the electromagnetic diameter D, and the abscissa represents the number of revolutions (rpm). In addition, there is a relationship between d/D and the height of the motor, and the range above the line a is unsuitable. Further, in the relationship between d/D and the range in which the bearing is capable of radially floating, the range below the line b is unsuitable. Furthermore, the in the relationship between d/D and the starting time of the motor, the range below the line c is unsuitable.

To reduce the height of the motor, it is undesirable to vertically arrange the electromagnetically opposing portions of the stator 2 and the rotor 5 and the bearing opposing portions between the inner ring 8b and the outer ring 8a. Accordingly, in terms of the structure, the ratio d/D between the bearing diameter d and the electromagnetic diameter D must be smaller than 4/5, as shown by the line a in FIG. 8.

To obtain sufficient floating force between the inner ring 8b and the outer ring 8a when the number of revolutions is low, it is necessary to enlarge the bearing diameter d of the hydrodynamic gas radial bearing 8 so as to increase the opposing area between the inner ring 8b and the outer ring 8a. In addition, if the number of revolutions is increased, the relative speed between the inner ring 8b and the outer ring 8a in the diameter portion of the bearing becomes large, so that the diameter of the bearing can be made small. However, if the diameter of the bearing is made excessively small, the number of revolutions must be increased for floating, so that it takes time until the floating of the radial bearing portion. This is also related to the fact that if the design is made to increase the number of revolutions without changing the motor size, the starting torque of the motor is designed to be low, in which case there are instances where the motor cannot be started. For this reason, it is necessary to design the ratio d/D between the bearing diameter d and the electromagnetic diameter D to be larger than 2/5, as shown by the lines b and c in FIG. 8.

As described above, it is necessary to determine the ratio d/D between the bearing diameter d and the electromagnetic diameter D in such a way as to satisfy the conditions of the height of the motor, radial floatability, and the starting time. Accordingly, the ratio d/D between the bearing diameter d and the electromagnetic diameter D is set to fall within the shaded portion surrounded by the lines a, b, and c, as shown in FIG. 8.

It should be noted that although, in the above-described embodiments, the arrangement provided is such that the bracket 1 is provided on the fixed side, the housing 4 is provided on the rotating side, and the disk is mounted on the housing 4, it is possible to adopt an arrangement in which the rotating side and the fixed side of the bearing structure shown in FIGS. 1 through 7 are reversed by providing the bracket 1 on the rotating side, providing the housing 4 on the fixed side, and mounting the disk on the rotating side, and by attaching the stator 2 on the housing 4 and attaching the rotor 5 on the bracket 1.

In addition, in the present invention, insofar as the opposing surfaces of the thrust shaft member and the thrust bearing member of the hydrodynamic gas thrust bearing are arranged within the bearing-functional-dimension region L of the hydrodynamic gas radial bearing 8, the present invention is not limited to the arrangements described in the above-described embodiments.

What is claimed is:

1. A spindle motor comprising:
a hydrodynamic gas radial bearing having a radial shaft member including a hollow cylinder and fixed to a fixing member, and a radial bearing member fixed to a rotating member and opposed to said radial shaft member in a radial direction of said rotating member; and
a hydrodynamic fluid thrust bearing having a thrust shaft member fixed to said fixing member and a thrust bearing member fixed to said rotating member and disposed inside the hollow cylinder, and including a magnetic-fluid retaining mechanism for retaining a magnetic fluid located on an inner surface of the hollow cylinder of a portion of said thrust bearing member, said thrust shaft member and said thrust bearing member being opposed to each other in an axial direction of said rotating member, wherein opposing surfaces of said thrust shaft member and said thrust bearing member of said hydrodynamic fluid thrust bearing are arranged within a bearing-functional-dimension region of said hydrodynamic gas radial bearing.

2. The spindle motor according to claim 1, wherein a ratio between, a radial bearing diameter and, an electromagnetic diameter for rotating said radial bearing member by electromagnetic action ranges from 2/5 to 4/5.

3. A spindle motor comprising:

a hydrodynamic gas radial bearing having a radial shaft member including a hollow cylinder and a ball located inside the hollow cylinder and fixed to a fixing member, and a radial bearing member fixed to a rotating member, said radial shaft member and said radial bearing member being opposed to each other in a radial direction of said rotating member; and a thrust bearing having a thrust shaft member fixed to said fixing member and a thrust bearing member supported by a surface of said ball and fixed to said rotating member, said thrust shaft member and said thrust bearing member being opposed to each other in an axial direction of said rotating member, wherein opposite surfaces of said thrust shaft member and said thrust bearing member of said thrust bearing are arranged within a bearing-functional-dimension region of said hydrodynamic gas radial bearing.

4. The spindle motor according to claim 3, wherein a portion of said thrust bearing member extends into an interior of the hollow cylinder to support the surface of said ball.

5. The spindle motor according to claim 3, including a buffer member wherein said thrust bearing member is fixed to said rotating member through said buffer member.

6. The spindle motor according to claim 3, wherein a ratio between a radial bearing diameter and an electromagnetic diameter for rotating said radial bearing member by electromagnetic action ranges from 2/5 to 4/5.

* * * * *